US008950723B1

(12) United States Patent
Fogelstrom et al.

(10) Patent No.: US 8,950,723 B1
(45) Date of Patent: Feb. 10, 2015

(54) BRACKET ASSEMBLY FOR MOUNTING A VERTICALLY DISPOSED SUPPORT MEMBER

(71) Applicants: Eric Fogelstrom, Omaha, NE (US); Leonard J. Hallowell, Omaha, NE (US)

(72) Inventors: Eric Fogelstrom, Omaha, NE (US); Leonard J. Hallowell, Omaha, NE (US)

(73) Assignee: 5/4 Deckor, LLC, Omaha, NE (US)

( * ) Notice: Subject to any disclaimer, the term of this patent is extended or adjusted under 35 U.S.C. 154(b) by 207 days.

(21) Appl. No.: 13/685,934

(22) Filed: Nov. 27, 2012

(51) Int. Cl.
*A01K 97/10* (2006.01)
*H01Q 21/00* (2006.01)
*F16M 13/02* (2006.01)

(52) U.S. Cl.
CPC .................................... *F16M 13/02* (2013.01)
USPC ........... 248/539; 248/523; 248/524; 248/534; 248/535; 248/536; 248/218.4; 248/219.1; 248/511; 248/518; 248/219.4; 248/541; 248/230.1; 248/229.1; 248/540; 248/537; 248/519; 248/158; 248/227.3; 248/222.14; 248/230.9; 135/16; 211/62; 211/63; 40/607.1; 343/890; 343/892

(58) Field of Classification Search
USPC ............. 248/539, 523–524, 534–536, 218.4, 248/219.1, 511, 518, 219.4, 541, 230.1, 248/229.1, 540, 538, 537, 519, 158, 227.3, 248/222.14, 230.9; 135/16; 211/63, 62; 40/607.1; 343/890, 892
See application file for complete search history.

(56) References Cited

U.S. PATENT DOCUMENTS

| | | | | |
|---|---|---|---|---|
| 1,564,703 | A * | 12/1925 | Nichols | 248/539 |
| 1,720,322 | A * | 7/1929 | Ferraioli | 248/539 |
| 2,208,358 | A * | 7/1940 | Chandler | 248/540 |
| 2,681,195 | A * | 6/1954 | Bradt et al. | 248/536 |
| 2,831,339 | A * | 4/1958 | Jones | 52/27 |
| 3,077,613 | A | 2/1963 | Mayer | |
| 3,358,952 | A * | 12/1967 | Burns | 248/539 |
| 3,943,524 | A | 3/1976 | Sample | |
| 4,595,165 | A * | 6/1986 | Klingensmith et al. | 248/539 |
| 4,856,616 | A * | 8/1989 | Anderson | 182/113 |
| 5,492,294 | A * | 2/1996 | Haeussler | 248/229.1 |
| 5,961,092 | A * | 10/1999 | Coffield | 248/539 |
| 6,175,339 | B1 * | 1/2001 | Macon | 343/892 |
| 6,702,245 | B1 * | 3/2004 | Otterman | 248/536 |
| 6,808,151 | B1 * | 10/2004 | McLaughlin et al. | 248/354.1 |
| 7,740,216 | B1 * | 6/2010 | Puckett et al. | 248/230.5 |
| 2002/0096616 | A1 | 7/2002 | Ratcliff et al. | |
| 2007/0034758 | A1 | 2/2007 | Bates | |
| 2007/0108363 | A1 | 5/2007 | Metheny | |
| 2009/0188751 | A1 * | 7/2009 | Gilliam | 182/112 |

* cited by examiner

*Primary Examiner* — Christopher Garft
(74) *Attorney, Agent, or Firm* — Dennis L. Thomte; Thomte Patent Law Office LLC

(57) ABSTRACT

A bracket assembly for securing a vertically disposed elongated cylindrical support member to a vertically disposed post or the like. The bracket assembly includes an upper bracket and a lower bracket. The upper bracket includes upper and lower plate members having uniquely designed openings formed therein. The lower bracket includes upper and lower plate members with the upper plate member of the lower bracket having a uniquely shaped opening formed therein. A clamping means is also provided on the lower plate member of the upper bracket and on the upper plate member of the lower bracket.

1 Claim, 5 Drawing Sheets

BRACKET ASSEMBLY FOR MOUNTING A VERTICALLY DISPOSED SUPPORT MEMBER

BACKGROUND OF THE INVENTION

1. Field of the Invention

This invention relates to a bracket assembly which is secured to a vertically disposed support such as a deck post or the like for mounting a vertically disposed support member such as a flag pole, umbrella, Shepherd's hook, bird feeder, bird house, Tiki torch or the like. More particularly, this invention relates to a bracket assembly which may accommodate cylindrical support members having varying diameters.

2. Description of the Related Art

Many types of support brackets or mounts have been previously provided to enable various accessories such as a flag pole, umbrella, Shepherd's hook, bird feeder, bird house, Tiki torch or the like to be attached thereto. For example, see U.S. Pat. No. 3,943,524 and US Published Application Nos. 2007/0034758A1 and 2007/0108363A1. It is Applicants' belief that the structure of U.S. Pat. No. 3,943,524 cannot accommodate pole members or support members having various diameters. It is Applicants' belief the structure of US Published Application 2007/0034758A1 cannot be used effectively with poles or support members having different diameters. Although the structure of US Published Application 2007/0108363 is able to accommodate poles having various diameters, inserts must be used for the poles having different diameters.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A bracket assembly is disclosed for mounting a vertically disposed and elongated cylindrical or tubular support member, having upper and lower ends, to a vertically disposed support such as a deck post or the like. The bracket assembly includes upper and lower brackets which are mountable to the support. The upper bracket includes a vertically disposed flat base plate having a first side edge, a second side edge, an upper end, a lower end, an inner side and an outer side. The upper bracket has an upper plate member which extends horizontally outwardly from the upper end of the base plate. The upper bracket also has a lower plate member which extends horizontally outwardly from the lower end of the base plate. The upper plate member of the upper bracket has an opening formed therein which is adapted to have a cylindrical or tubular support member extending downwardly therethrough. The lower plate member of the upper bracket has an opening formed therein which is adapted to have the cylindrical or tubular support member extending downwardly therethrough. The openings in the upper and lower plate members have a unique configuration which will accommodate cylindrical or tubular support members having varying diameters. The lower plate member of the upper bracket has a threaded clamp member, with inner and outer ends, mounted thereon with the inner end thereof being movable into clamping engagement with the cylindrical or tubular support member.

The lower bracket is mountable to the support below the upper bracket and includes a vertically disposed flat base plate having a first side edge, a second side edge, an upper end, a lower end, an inner side and an outer side. The lower bracket has an upper plate member which extends horizontally outwardly from the upper end of the base plate thereof. The lower bracket has a lower plate member which extends outwardly from the lower end of the base plate thereof. The upper plate member of the lower bracket has an opening formed therein adapted to have the cylindrical or tubular support member extending downwardly therethrough. The opening in the upper plate member of the lower bracket also has a unique configuration adapted to accommodate cylindrical or tubular support members having varying diameters. The lower end of the cylindrical or tubular support member is in engagement with the lower plate member of the lower bracket.

In the preferred embodiment, the upper plate member of the lower bracket also has a threaded clamp member associated therewith. In the preferred embodiment, each of the base plates has fastener openings formed therein to enable screws or bolts to be extended therethrough to secure the base plates of the upper and lower brackets to the support.

In the preferred embodiment, the upper bracket, with the exception of the clamp member, is of one-piece construction. In the preferred embodiment, the lower bracket, with the exception of the clamp member associated therewith, is of one-piece construction.

In the preferred embodiment, the lower plate member of the lower bracket is disposed at an angle with respect to horizontal.

It is therefore a principal object of the invention to provide an improved bracket assembly of the type described which includes upper and lower brackets secured to a vertically disposed support such as a deck post or the like.

A further object of the invention is to provide a bracket assembly of the type described wherein uniquely shaped openings are formed in the upper and lower plate members of the upper bracket and in the upper plate member of the lower bracket which accommodates cylindrical or tubular support members having varying diameters.

A further object of the invention is to provide a bracket assembly for mounting a vertically disposed and elongated cylindrical or tubular support member in a way which prevents the separation of the cylindrical or tubular support member from the bracket assembly.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
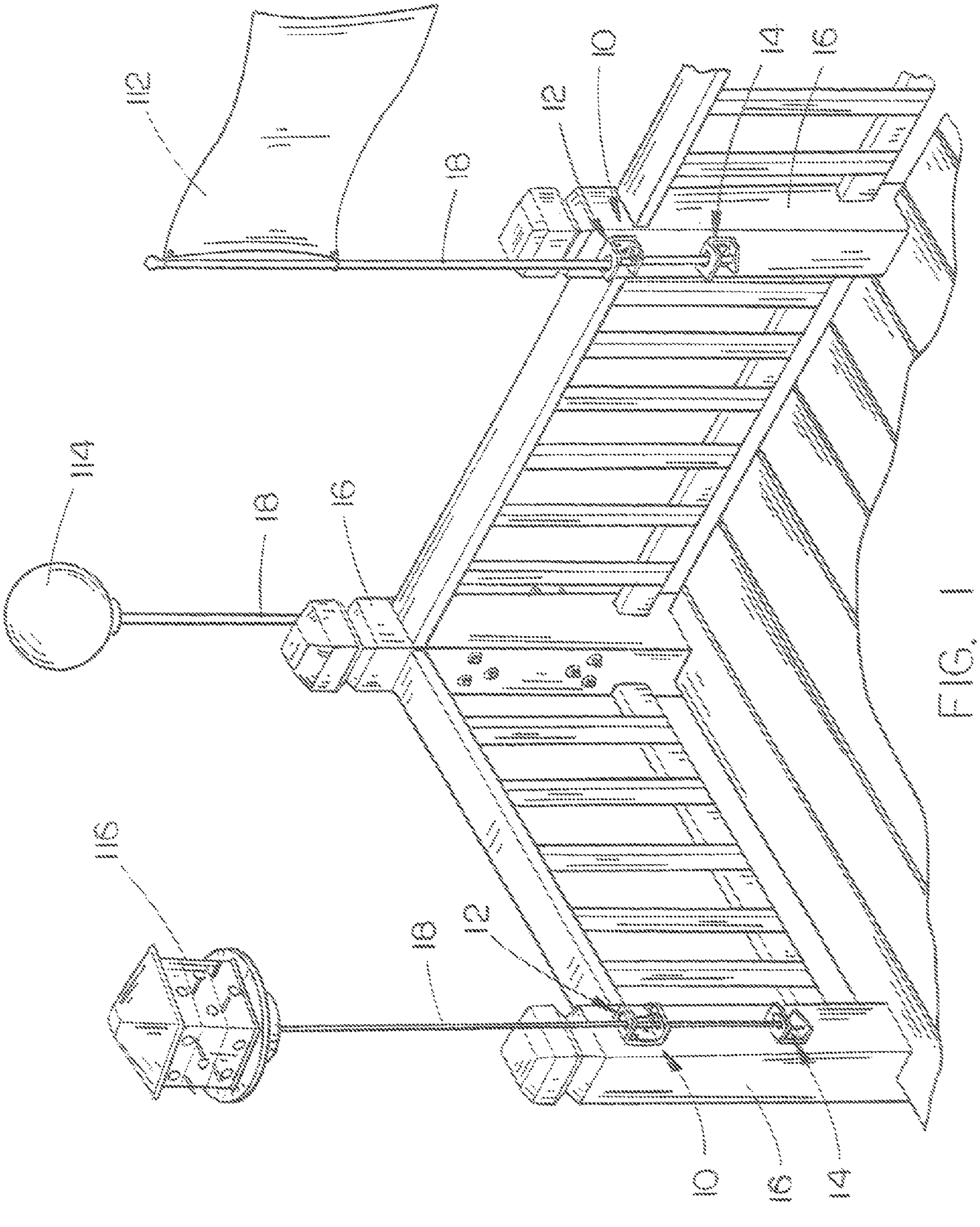
FIG. 1 is a perspective view illustrating the bracket assembly of this invention supporting cylindrical or tubular support members having various objects mounted on the upper ends thereof.
Figure 3:
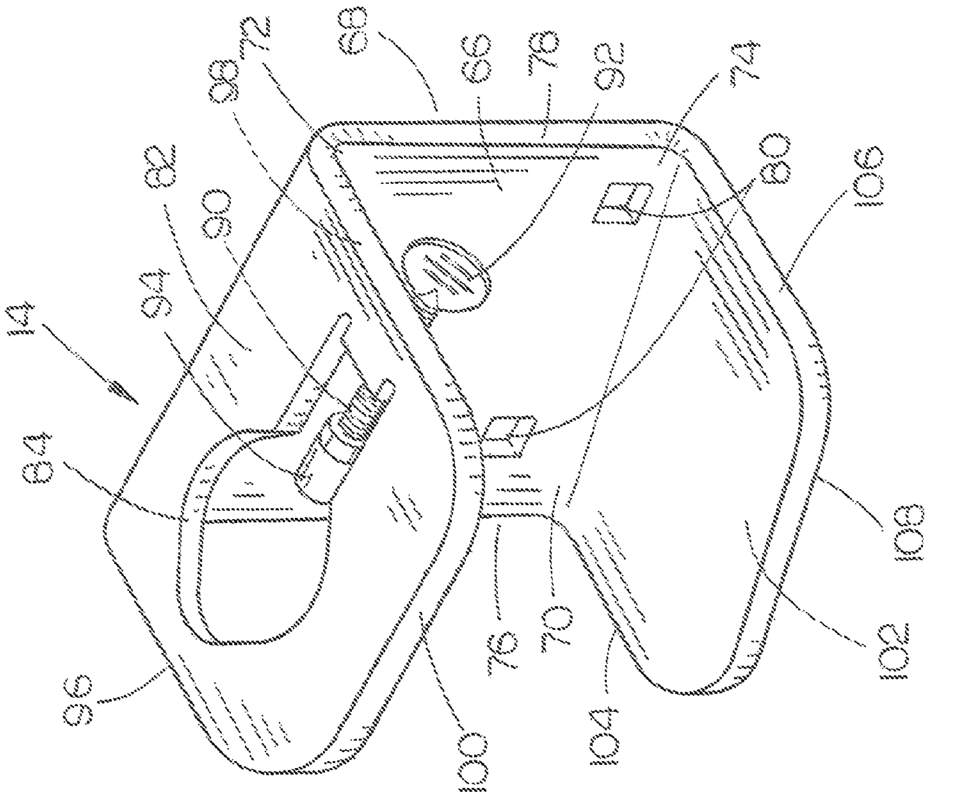
FIG. 3 is a perspective view of the lower bracket of the bracket assembly of this invention.
Figure 2:
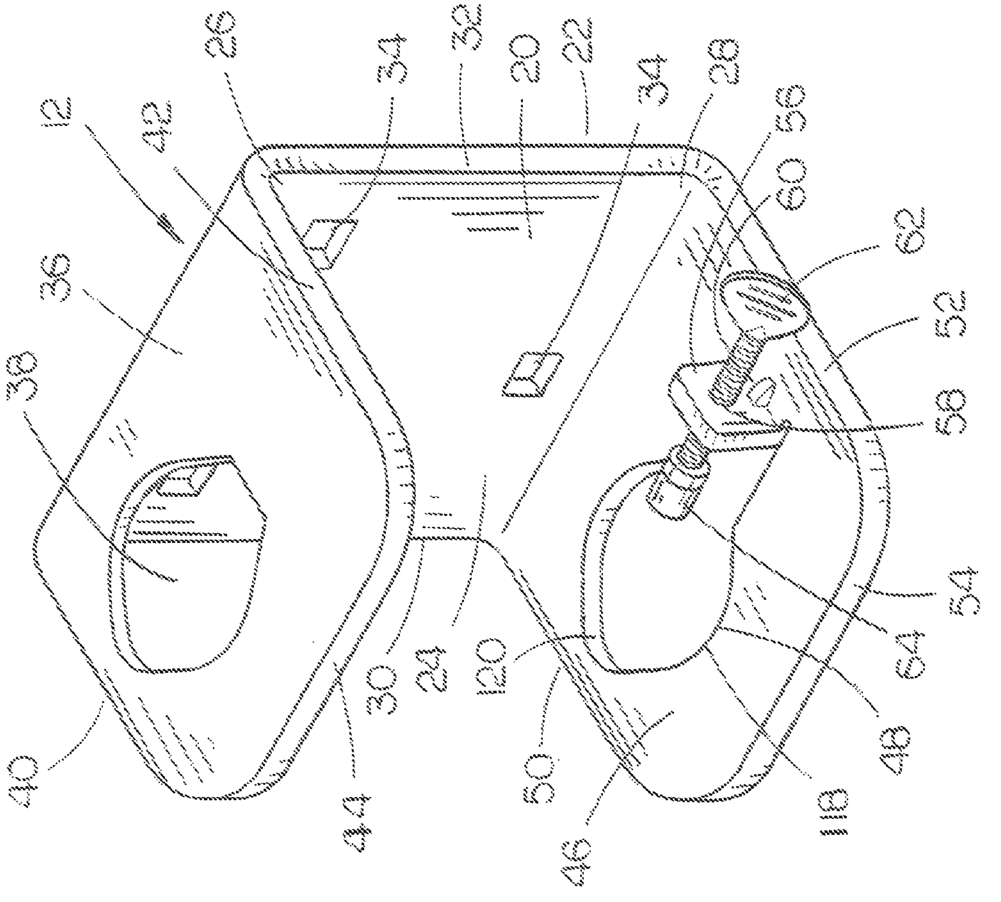
FIG. 2 is a perspective view of the upper bracket of the bracket assembly of this invention.
Figure 4:
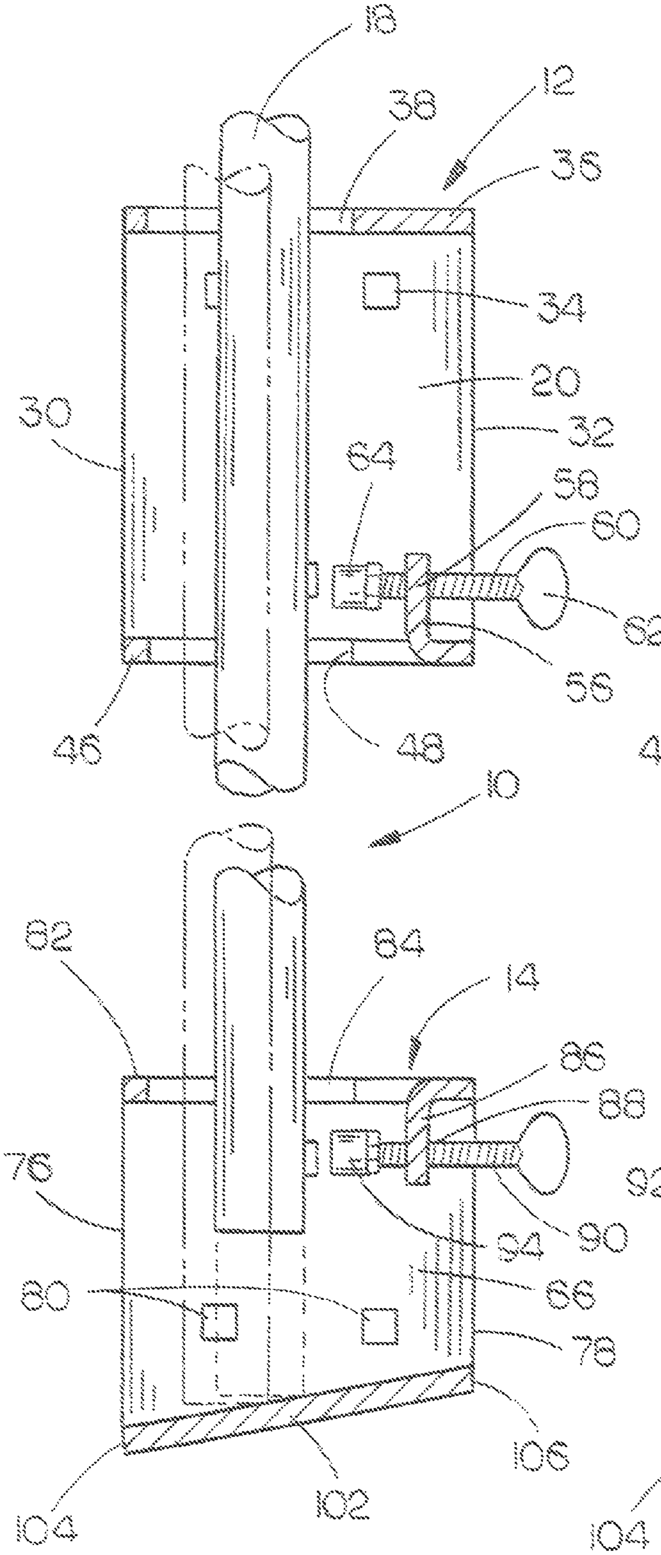
FIG. 4 is a view illustrating a cylindrical or tubular support member being extended downwardly through the upper and lower brackets of the bracket assembly of this invention.
Figure 5:
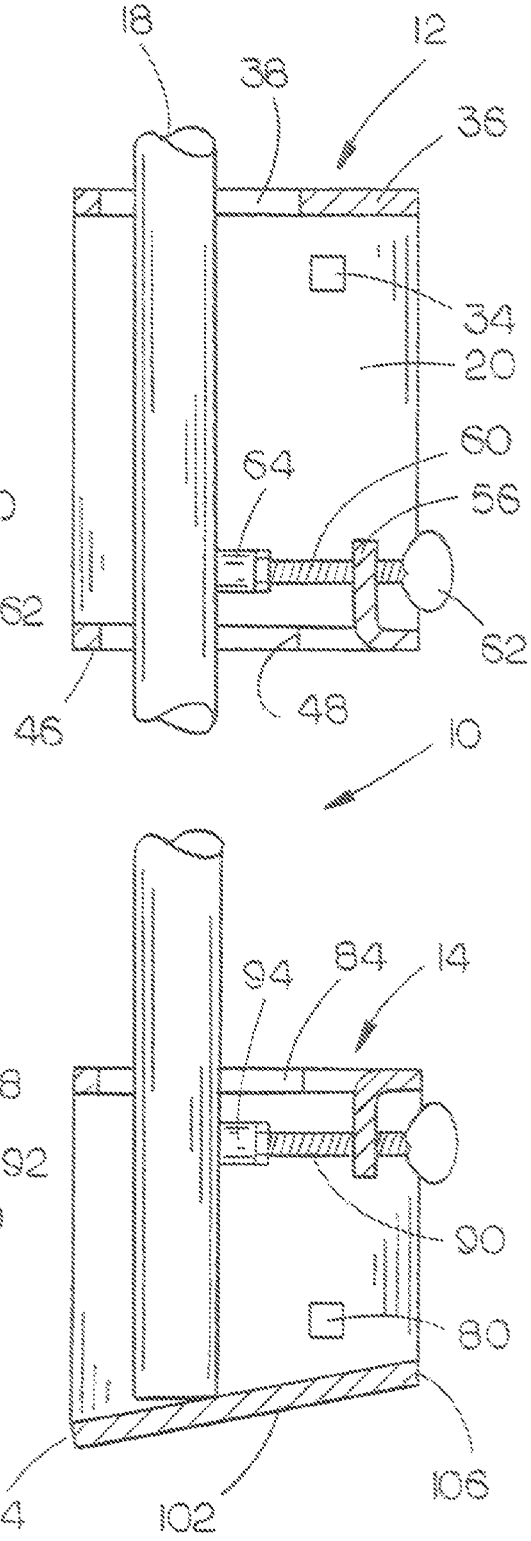
FIG. 5 is a view illustrating a cylindrical or tubular support member being secured to the upper and lower brackets of the bracket assembly of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The bracket assembly of this invention is referred to by the reference numeral 10. Bracket assembly 10 includes an upper bracket 12 and a lower bracket 14. Bracket assembly 10 is designed so as to be mountable on a vertically disposed wood deck post 16 or other vertically disposed support. Bracket assembly 10 is designed to support a vertically disposed and elongated cylindrical or tubular support member 18 such as found on a flag pole, umbrella, Shepherd's hook, bird feeders, bird house, Tiki torch, etc.

Upper bracket 12 includes a vertically disposed flat base plate 20 having an inner side 22, outer side 24, an upper end 26, a lower end 28, a first side edge 30 and a second side edge 32. Base plate 20 includes a plurality of spaced-apart fastener openings 34 formed therein to enable fasteners such as screws or bolts 35 to be inserted thereinto to secure the upper bracket 12 to the post 16 or other vertically disposed support.

Upper bracket 12 includes an upper plate member 36 which extends transversely outwardly from the upper end 26 of base plate 20. Plate member 36 has an opening 38 formed therein which will be described in detail hereinafter. Upper plate member 36 will be described as having a first side edge 40, a second side edge 42 and an outer end 44. Upper bracket 12 includes a lower plate member 46 which extends transversely from the lower end 28 of base plate 20. Lower plate member 46 has an opening 48 formed therein which is substantially identical to opening 38. Lower plate member 46 will be describes as having a first side edge 50, a second side edge 52 and an outer end 54. A tab 56 extends upwardly from lower plate member 46 and has an internally threaded opening 58 formed therein. An elongated clamping bolt 60 is threadably received by threaded opening 58. Bolt 60 has a wing 62 at its outer end and a plastic head 64 at its inner end.

Lower bracket 14 includes a vertically disposed flat base plate 66 having an inner side 68, an outer side 70, an upper end 72, a lower end 74, a first side edge 76 and a second side edge 78. Base plate 66 includes a plurality of spaced-apart fastener openings 80 formed therein to enable fasteners such as screws or bolts 81 to be inserted thereinto so secure the lower bracket 14 to the post 16 or other vertically disposed support below upper bracket 12.

Lower bracket 14 includes an upper plate member 82 which extends transversely outwardly from the upper end 72 of base plate 66. Plate member 82 has an opening 84 formed therein which has the same shape as opening 48 in lower plate member 46 of upper bracket 12.

A tab or ear 86 extends downwardly from upper plate member 82 and has an internally threaded opening 88 formed therein. An elongated clamping bolt 90 is threadably received by threaded opening 88. Bolt 90 has a wing 92 at its outer end and a plastic head 94 at its inner end. For purposes of description, upper plate member 82 of lower bracket 14 will be described as having a first side edge 96, a second side edge 98 and an outer end 100.

Lower bracket 14 also includes a lower plate member 102 which extends outwardly from the lower end of base plate 66. For purposes of description, lower plate member 102 will be described as having a first side edge 104, a second side edge 106 and an outer end 108. In the preferred embodiment, lower plate member 102 is disposed at approximately a 10 degree angle with respect to horizontal so that side edge 104 is disposed below side edge 106 . . . .

Preferably, with the exception of the clamping bolts, the upper and lower brackets are constructed from a metal material such as steel, iron or aluminum. Preferably, with the exception of the clamping bolt 60, upper bracket 12 is of one-piece construction. Preferably, with the exception of the clamping bolt 90, lower bracket 14 is of one-piece construction.

Figure 6:
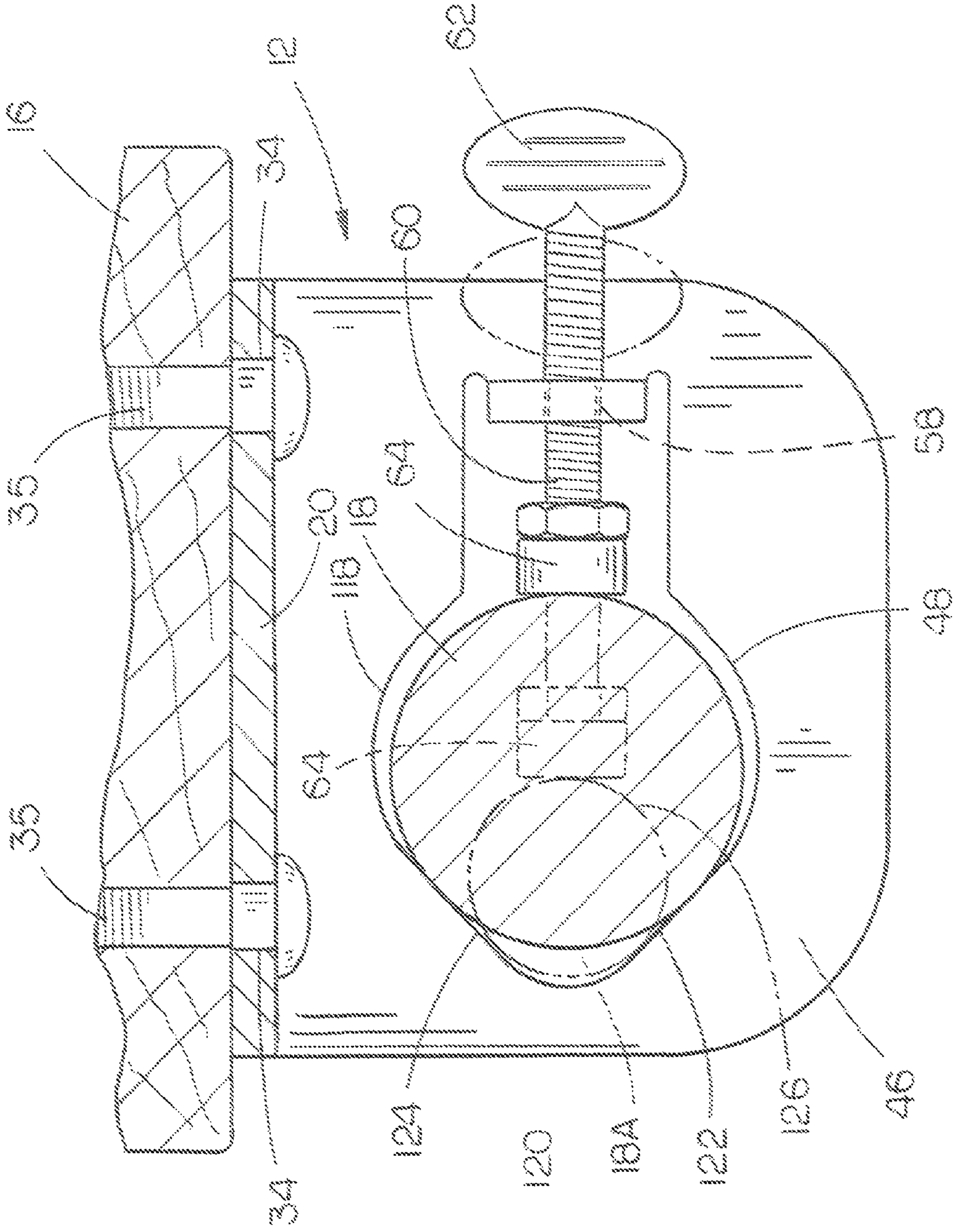
FIG. 6 is a sectional view illustrating the manner in which support members of varying diameters are secured to the upper bracket of the bracket assembly.
Figure 7:
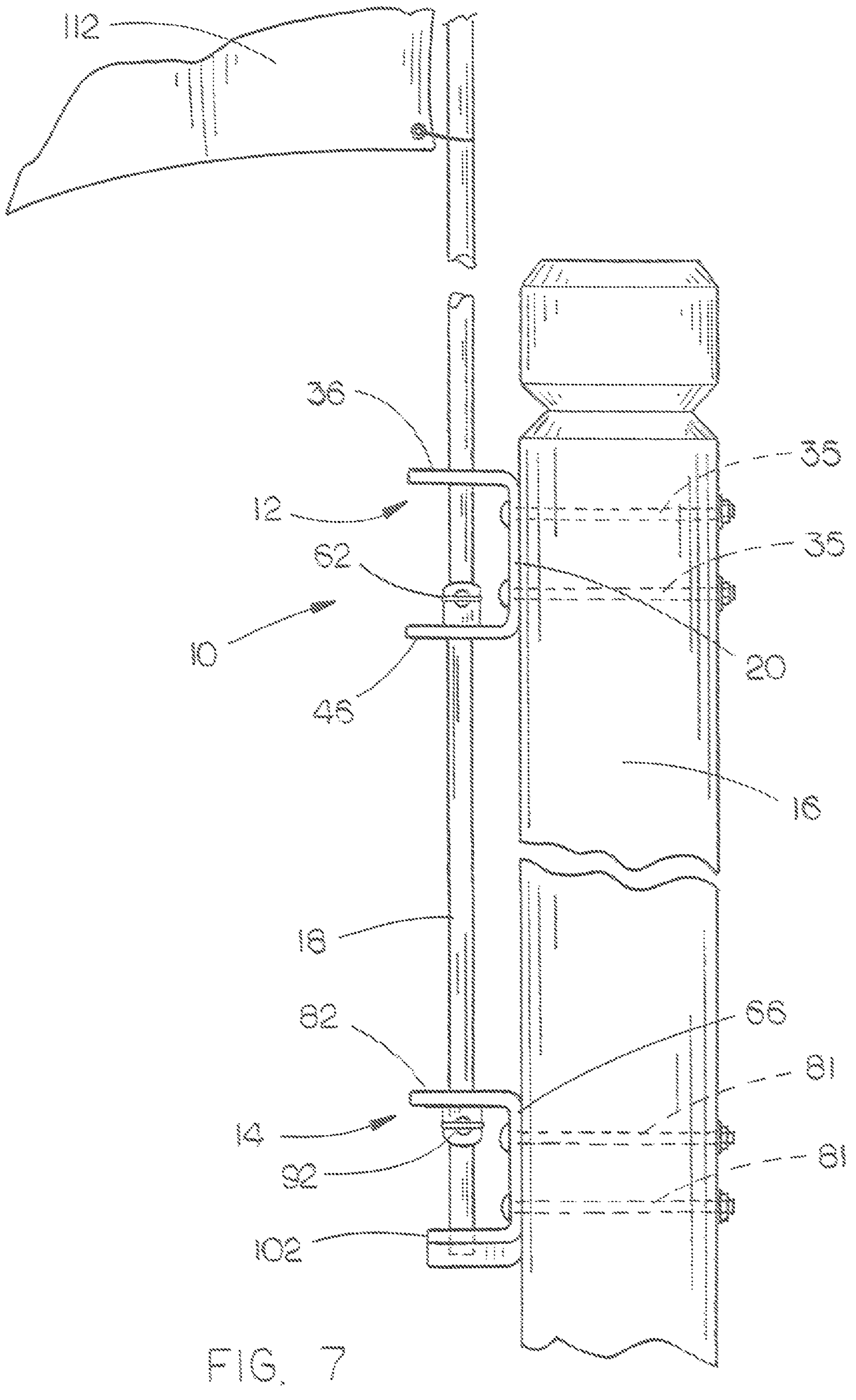
FIG. 7 is a side view illustrating a support member secured to the upper and lower brackets of the bracket assembly.

Inasmuch as each of the openings 38, 48 and 84 are essentially identical, only opening 48 will be described in detail. Opening 48 includes a semi-circular portion 118 and a generally U-shaped portion 120 at one end thereof. The juncture of U-shaped portion 120 with semi-circular portion 118 defines shoulders 122 and 124 therebetween. The shape of opening 48 enables support members 18 of varying diameters to be inserted therein and centered therein. As seen in FIG. 6, when a large diameter support member 18 is inserted in opening 48, the clamping action of clamping bolt 60 causes the larger diameter support member to be moved to the left until the support member engages the shoulders 122 and 124 to center the support member 18 in opening 48. If a smaller diameter support member 18A is received in the opening 48, the clamping action of clamping bolt 60 will center the support member 18A within the U-shaped portion 120 of opening 48.

In use, the upper bracket 12 and the lower bracket 14 will be secured to the post 16 by the bolts or screws 35 and 81 respectively. When the lower end of the support member 18 engages the inclined lower plate member 102 of lower bracket 14, the inclination of the lower plate member 102 urges the lower end of the support member 18 to the left, as viewed in FIG. 6, to center the support member 18 into engagement with the shoulders 122 and 124. The clamping bolts 60 and 90 are then tightened to move the head portions 64 and 94 thereof into clamping engagement with the support member 18 to maintain the support member 18 in the brackets 12 and 14.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A bracket assembly for mounting a vertically disposed and elongated cylindrical support member, having upper and lower ends, to a vertically disposed support, comprising:

an upper bracket mountable to the support;

said upper bracket including a vertically disposed flat base plate having a first side edge, a second side edge, an upper end, a lower end, an inner side and an outer side;

said upper bracket having an upper plate member which extends horizontally outwardly from said upper end of said base plate thereof;

said upper bracket having a lower plate member which extends horizontally outwardly from said lower end of said base plate thereof;

said upper plate member of said upper bracket having an opening formed therein adapted to have the cylindrical support member extending downwardly therethrough;

said lower plate member of said upper bracket having an opening formed therein adapted to have the cylindrical support member extending downwardly therethrough;

said lower plate member of said upper bracket having a first threaded clamp member with inner and outer ends, mounted thereon with the inner end thereof being movable into clamping engagement with the cylindrical support member;

a lower bracket mountable to the support below said upper bracket;

said lower bracket including a vertically disposed flat base plate having a first side edge, a second side edge, an upper end, a lower end, an inner side and an outer side;

said lower bracket having an upper plate member extending horizontally outwardly from said upper end of base plate thereof;

said lower bracket having a lower plate member extending outwardly from said lower end of said base plate thereof;

said upper plate member of said lower bracket having an opening formed therein adapted to have the cylindrical support member extending downwardly therethrough;

the lower end of the cylindrical support member being in engagement with said lower plate member of said lower bracket;

said upper plate member of said lower bracket having a second threaded clamp member, with inner and outer ends, mounted thereon with the inner end thereof being movable into clamping engagement with the cylindrical support member;

each of said openings in said upper plate member of said upper bracket, said lower plate member of said upper bracket, and said upper plate member of said lower bracket having a first generally semi-circular portion and a second generally U-shaped portion whereby larger diameter support members are partially receivable in said first generally semi-circular portion of the opening and whereby smaller diameter support members are partially receivable in said second generally U-shaped portion of the opening;

said first and second threaded clamp members force the support member towards the second generally U-shaped portions of each of the openings;

said lower plate member of said lower bracket being disposed at an angle with respect to horizontal;

said angle disposed at approximately 10 degrees with respect to horizontal;

said upper bracket being of one-piece construction;

said lower bracket being of one-piece construction.

* * * * *